United States Patent [19]

Montgomery

[11] 4,064,837
[45] Dec. 27, 1977

[54] SELF-CONTAINED AQUARIUM SYSTEM

[75] Inventor: William H. Montgomery, Hayward, Calif.

[73] Assignee: Aqua Plex Products, San Leandro, Calif.

[21] Appl. No.: 632,301

[22] Filed: Nov. 17, 1975

[51] Int. Cl.² .............................................. A01K 63/00
[52] U.S. Cl. .......................................................... 119/5
[58] Field of Search ........................... 210/169; 119/2-5

[56] References Cited

U.S. PATENT DOCUMENTS

| 3,513,978 | 5/1970 | Newsteder | 119/5 |
| 3,693,798 | 9/1972 | White | 210/169 |

FOREIGN PATENT DOCUMENTS

| 200,867 | 1/1966 | Sweden | 119/5 |
| 1,329,962 | 9/1973 | United Kingdom | 119/5 |

*Primary Examiner*—G. E. McNeill
*Assistant Examiner*—Peter K. Skiff

*Attorney, Agent, or Firm*—Flehr, Hohbach, Test, Albritton & Herbert

[57] ABSTRACT

Self-contained aquarium system having a tank with a bottom wall and side walls for containing water. A filter unit is disposed in the tank and provides a filter surface which is spaced above the bottom wall of the tank. A dividing wall is provided within the tank and forms a main compartment and an equipment compartment in the tank. The dividing wall has an opening therein to permit the flow of water from below the filter grid in the tank and into the equipment compartment. A removable enclosed filter box is disposed in the equipment compartment and has an opening therein in registration with the opening in the dividing wall and has another opening remote from the first named opening. Filter material is disposed in the filter box and is arranged so that water entering the first named opening in the filter box and leaving through the other opening will pass through the filter material. Air pump means is provided for introducing air into the water in the lower end of a pipe after it has passed through the filter material to utilize the airlift principle.

9 Claims, 5 Drawing Figures

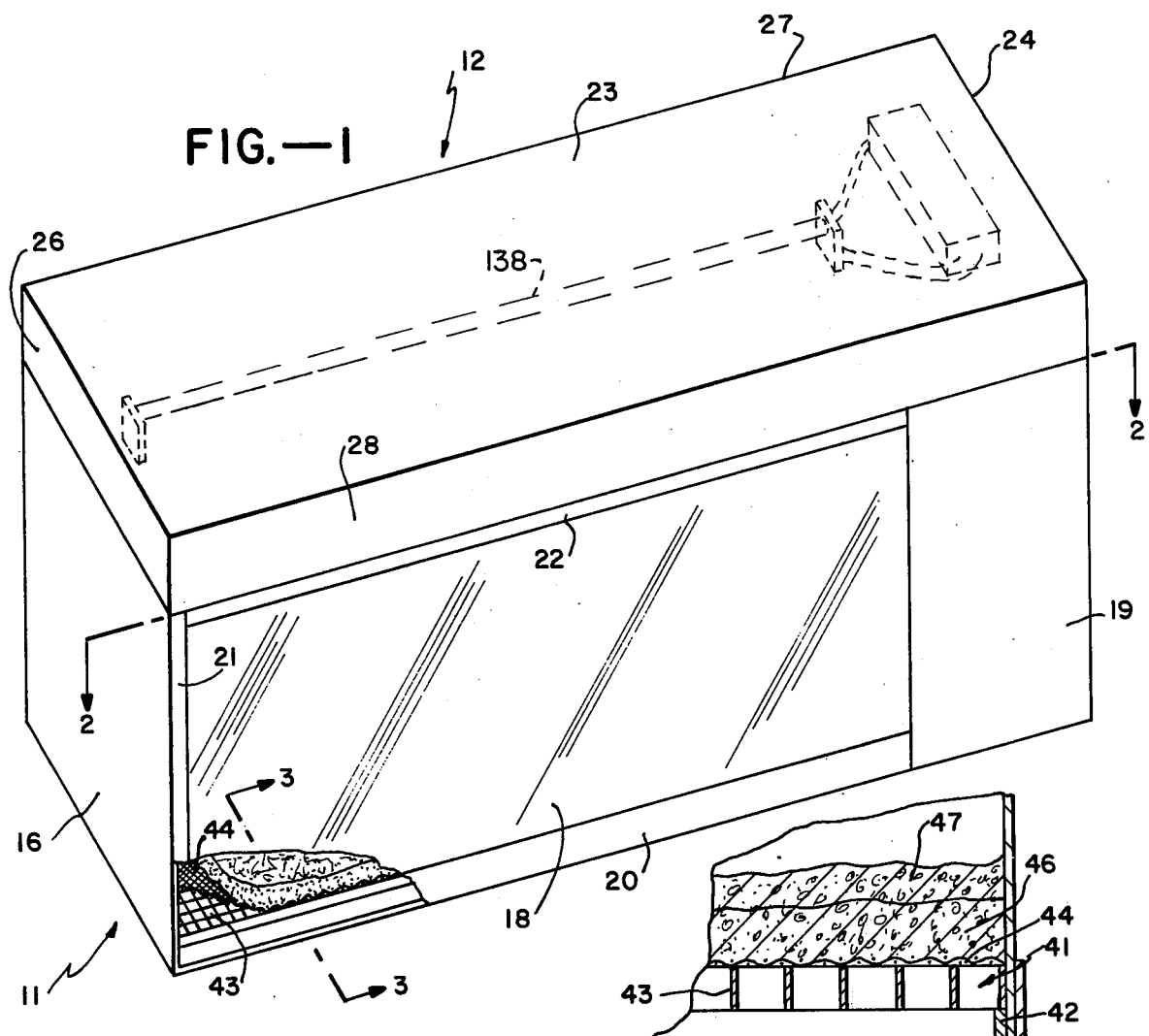
FIG.—1
FIG.—3
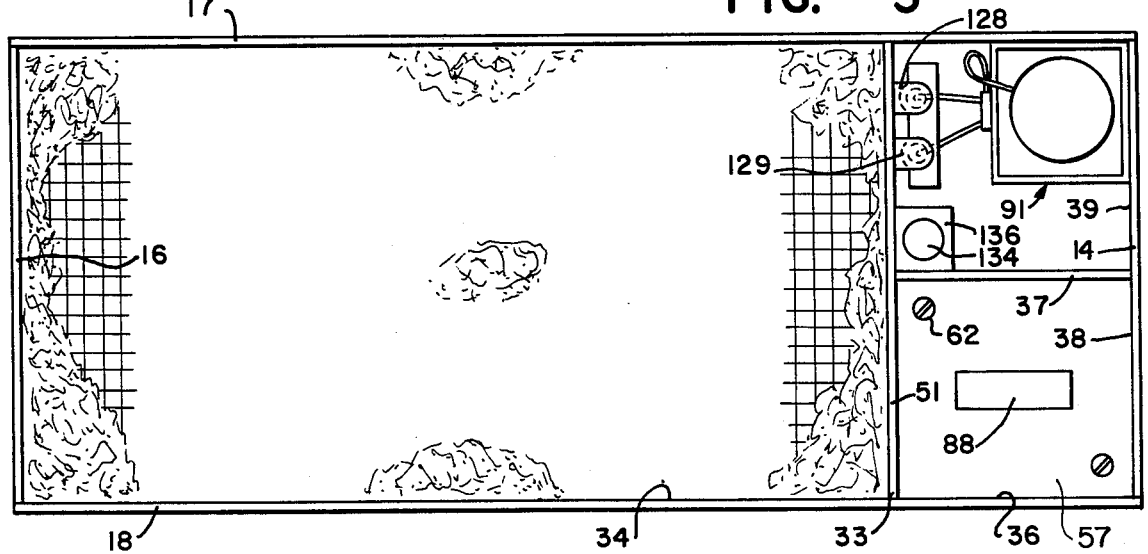
FIG.—2

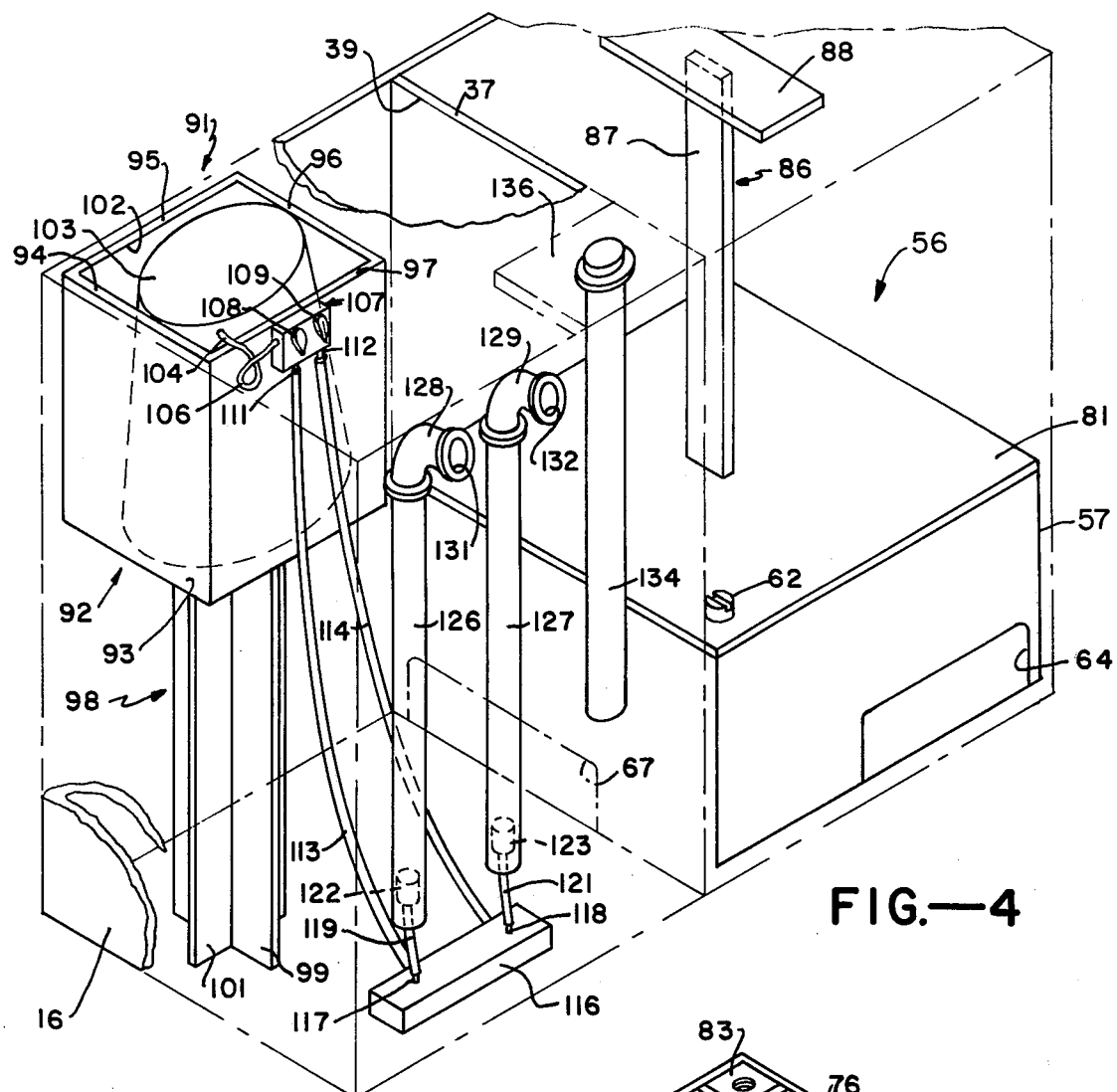
FIG.—4
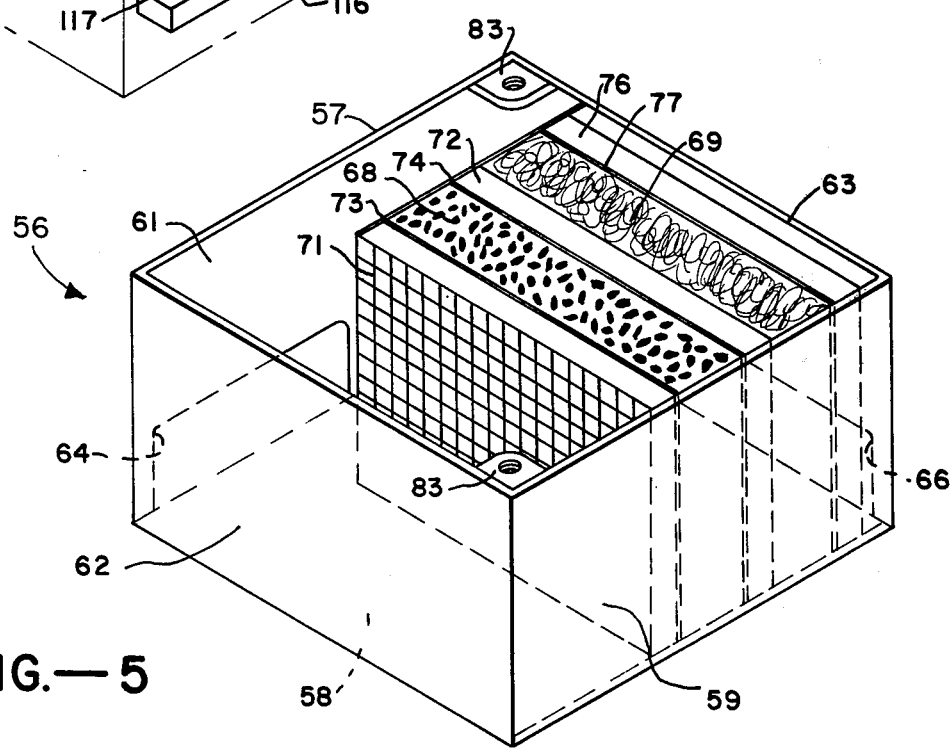
FIG.—5

4,064,837

SELF-CONTAINED AQUARIUM SYSTEM

BACKGROUND OF THE INVENTION

Aquariums and self-contained aquarium systems have heretofore been provided. However, such aquariums and aquarium systems have had numerous deficiencies such as being unattractive, noisy, difficult to maintain and the like.

SUMMARY OF THE INVENTION AND OBJECTS

Self-contained aquarium system comprising a tank having a bottom wall and side walls for containing water. A filter grid is disposed in the tank and provides a filter surface spaced above the bottom wall of the tank. A dividing wall is disposed within the tank and forms main and equipment compartments in the tank. The dividing wall has an opening therein to permit the flow of water from the tank through the filter grid and into the equipment compartment. A removable enclosed filter box is disposed in the equipment compartment and has an opening therein in registration with the opening in the dividing wall and has another opening remote from the first named opening. Filter material is disposed in the filter box and is arranged so that water entering the first named opening in the filter box and leaving through said another opening will pass through the filter material. Air pump means is provided for introducing air into the water in the lower end of a pipe utilizing the airlift principle as it leaves the filter box and before returning to the main portion of the tank.

In general, it is an object of the invention to provide a self-contained aquarium system which provides good biological and mechanical filtration.

Another object of the invention is to provide a system of the above character in which all operating parts are hidden from view to give improved visual pleasure for the aquarium.

Another object of the invention is to provide a system of the above character which inhibits evaporation of the water and which prevents pollutants from entering the system.

Another object of the invention is to provide a system of the above character which utilizes air lift principles.

Another object of the invention is to provide a system of the above character which reduces the maintenance required.

Another object of the invention is to provide a system of the above character which utilizes a submersible filter box in which the filter materials can be readily replaced.

Another object of the invention is to provide a system of the above character in which the various parts are arranged to enhance the visual appearance of the same.

Additional objects and features of the invention will appear from the following description in which the preferred embodiment is set forth in detail in conjunction with the accompanying drawings.

BRIEF DESCRIPTION OF THE DRAWINGS

FIG. 1 is an isometric view of a self-contained aquarium system incorporating the present invention.

FIG. 2 is a cross-sectional view taken along the line 2—2 of FIG. 1.

FIG. 3 is a cross-sectional view taken along the line 3—3 of FIG. 1.

FIG. 4 is an enlarged view of the equipment contained in the equipment compartment at one end of the aquarium.

FIG. 5 is an enlarged view of the portion of the filter box assembly shown in FIG. 4.

DESCRIPTION OF PREFERRED EMBODIMENT

The self-contained aquarium system shown in the drawings consists of a tank 11 which has a cover 12 mounted thereon. The tank 11 is provided with a planar bottom wall 13, and upstanding end walls 14 and 16 and upstanding side walls 17 and 18.

The tank 11 is formed of a suitable material such as plastic. By way of example, the front wall 18 is formed of a clear cast acrylic sheet, whereas the side walls 14 and 16 and the rear wall 17 are formed of a black cast acrylic sheet. A panel 19 formed of black cast acrylic is secured to the right-hand side of the front wall 18. The panel 19 can be provided with a hair cell finish to add to the attractive appearance of the aquarium. An additional bottom trim strip 20, a side trim strip 21 and a side trim strip 22 formed of black cast acrylic are secured to the exterior of the side wall 18 as shown.

The cover 12 is provided with a planar top wall 23, depending end walls 24 and 26, and depending side walls 27 and 28, all of which are formed of black cast acrylic. As can be seen from FIG. 1, the cover 12 is formed in such a manner so that it will fit on top of the tank 11 and to provide a generally box-like configuration which is rectangular in cross-section.

A dividing wall 33 is provided within the tank 11 and divides the tank into a main compartment 34 in which the fish or other sea life are contained and an equipment compartment 36 which carries the equipment for making the aquarium self-contained.

A filter grid assembly 41 is provided in the main compartment 34 of the tank 11. The filter grid assembly 41 consists of a pair of spaced parallel bars 42 which extend longitudinally of the tank 11 and which have mounted thereupon an egg crate-like construction 43 which is provided with a grid-like pattern and provides a planar surface which is parallel to and spaced from the bottom wall 13. The grid assembly 41 extends parallel to and spaced from substantially the entire bottom of the main compartment 34, as shown in FIG. 2. The screen 44 is of suitable small mesh such as that which is utilized for insect netting and is carried by the egg crate construction 43. A layer 46 of sand of a suitable thickness as, for example, 2 inches, is provided on the screen 44 and is spread uniformly over the same. An additional layer 47 is provided on the layer 46 and is formed of a suitable calcareous material such as dolomite, oyster shells, limestone, etc. This layer 47 can be formed to a suitable thickness as, for example, one inch, and is also spread relatively uniformly over the layer 46. The layers 46 and 47 serve as primary filtering means.

The dividing wall 33 is provided with an opening 51 adjacent the bottom wall 13 on the front side of the eqiupment compartment 36 (see FIG. 2).

Another wall 37 is mounted within the equipment compartment 36 and serves to divide the equipment compartment 36 into two smaller compartments, one a secondary filtration compartment 38, and the other a preheat compartment 39.

A removable enclosed filter box assembly 56 is provided in one portion of the filtration compartment 36. The filter box assembly 56 consists of a filter box 57 having a bottom wall 58, end walls 59 and 61, and side walls 62 and 63. The end wall 61 is provided with an opening 64 which is generally in registration with the opening 51 provided in the dividing wall 33. The filter box is provided with another opening 66 in the adjacent side wall 63 near the lower extremity thereof which is adapted to be placed in registration with another opening 67 provided in the dividing wall 37. Materials are disposed within the filter box 57 through which water must pass when it passes from opening 64 through opening 66. The filter materials include activated carbon granules 68 and filter floss 69. The carbon granules 68 are contained in a space provided between two grid-like egg crate structures 71 and 72 which are generally parallel and spaced apart and are secured to the end walls 61 and 62. Screens 73 and 74 are provided on the egg crate structures 71 and 72 to retain the carbon granules between the egg crate structures. The filter floss is disposed between the egg crate structure 72 and another egg crate structure 76 which also has a screen 77 provided thereon. The filter floss 69 plus the screen 77 serves to prevent the carbon granules from passing through the system. The cover 81 is removably mounted upon the filter box 57 by screws 82 extending through the cover and being threaded into ears 83 provided on the filter box 57. A "T" shaped handle 86 is secured to the cover 81 to facilitate lifting of the filter box assembly into and out of the equipment compartment 36.

The "T" shaped handle 86 consists of a vertical bar 87 which is secured to the cover 81 by suitable means such as cement. It also consists of a short bar 88 which is secured to the top end of the bar 87 by suitable means such as cement. The bar 88 serves as a handle with its upper surface lying in a plane which is parallel to but spaced slightly below the plane formed by the top sides of the end walls 14 and 16 and the side walls 17 and 18.

A movable air pump assembly 91 is mounted within the compartment 39 on the side wall 37 opposite the filter box assembly 56 in compartment 38. Air pump box assembly 91 consists of an enclosure or box-like structure 92 forming an air pump compartment having a bottom wall 93 and upstanding side walls 94, 95, 96 and 97. The box-like structure 92 is free of water and supported by a stand 98 formed by a pair of planar members 99 and 101 which are fitted together to provide a cross in cross-section. The bottom extremity of the stand 98 is adapted to rest upon the bottom wall 13 of the tank 11 and to support the box-like enclosure or structure 92 in such a manner so that its upper extremity lies in a plane which is slightly below the plane of the walls 14, 16, 17 and 18 of the tank 11.

The box-like structure 92 encloses a compartment or space 102 which is open at its top side and which is adapted to receive an air pump 103 of a conventional type. By way of example, the air pump can be of a type manufactured by Silent Giant of Prescott, Arizona. As can be seen from FIG. 4 of the drawing, the air pump 91 is adapted to be seated within the compartment or space 102 and have its top surface slightly below the surface of the box-like structure 92. The air output from the air pump is supplied through a flexible output tube 104 which has an anti-siphon loop 106 provided therein. The other end of the tube 104 is connected into a two gang valve assembly 107 of a conventional type manufactured by Penn-Plex of New Jersey.

The gang valve assembly 107 is provided with two control knobs or handles 108 and 109 whereby air supplied to the tube 104 can be supplied to either or both outlets 111 and 112. The outlets 111 and 112 are connected to flexible tubes 113 and 114 and are connected to a block 116 removably secured to the bottom wall 13 of the tank 11 by suitable means such as suction cups (not shown). The tubes 113 and 114 are in communication with upstanding outlet pipes 117 and 118. Flexible tubes 119 and 121 are connected thereto and have stones 122 and 123 mounted on the upper ends thereof. As is well known to those skilled in the art, the air stones 122 and 123 serve to diffuse the air entering through the tubes 119 and 121 so that many small air bubbles are formed in the water in the tank. The air stones 122 and 123 are disposed in the lower extremities of the pair of pipes or tubes 126 and 127 formed of a suitable rigid material such as plastic. The pipes 126 and 127 have their upper ends mounted by a slip fit in 90° elbows 128 and 129 which are cemented into holes provided in the wall 33 so that the outlet ports 131 and 132 of the elbows 128 and 129 are in communication with the main compartment 34.

Heating means is also provided in the compartment 39 in the form of a conventional aquarium type heater 134 which is mounted in a square plate 136 that is cemented to the wall 37 and the wall 33 as shown in FIG. 2.

A fluorescent lamp 138 is mounted within the interior of the cover 12.

Operation and use of the self-contained aquarium system may now be briefly described as follows. Let it be assumed that the tank 11 has been placed upon a suitable stand and that the primarly filtering means has been installed in the form of a layer of sand 46 and a layer 47 of calcareous material. Let it also be assumed that the aquarium has been filled with water of a suitable type, as for example, water which has been combined with a synthetic salt water mix to provide a water which is suitable for salt water or marine fish and invertebrates.

Let it also be assumed that the secondary filtration means in the form of the filter box has been filled with the carbon granules 68 and the filter floss 69 and the cover put in place and the filter box assembly 56 lowered into the secondary filtration compartment 38.

Let it be assumed that the heater 134 has been put in place as well as the air pump box assembly 91. The heater 134 and the air pump 103 can then be placed in operation. As soon as the air pump is placed in operation, air is supplied through the tube 104, through the tubes 113 and 114 to cause air to be supplied to the air stones 122 and 123. This will cause formation of many bubbles of air in water in the lower ends of the pipes 126 and 127. The bubbles form a mixture of air and water which is lighter than water alone. This mixture rises in the pipes and is replaced by additional water into which air bubbles are introduced. This process as herein described utilizes what has been termed an air lift principle to cause water to be removed from the compartment 39 and to be introduced into the main compartment 34. As recirculated water is introduced into the main compartment 34, it will mix with the water already in the main compartment and eventually will pass through the primary filtration means consisting of the layers 46 and 47, through the screen 44 and through the egg crate construction 43 and then movable on the bottom wall 13 toward the outlet opening 51 provided in the wall 53 and to the secondary filtration means provided by the filter box assembly 56. The water coming from the main compartment 34 will pass through the opening 64 to the filter box assembly 56 and then through the carbon granules 68 and the filter floss 69 and thence out the opening 66 into the preheat compartment 39 where the water will be heated and oxygenated and then re-introduced into the main compartment.

The self-contained aquarium system is very quiet in operation and has a minimum of wire leading therefrom. A single electrical cord can be provided for supplying energy to the lamp 138, to the pump 103 and to the heater 134. There are no external water or air tubes. The aquarium system is self-contained with the air pump being disposed within the confines of the aquarium as is the secondary filter system provided by the filter box assembly 56. The self-contained aquarium system of the present invention has many additional desirable characteristics. In addition to being very quiet in operation, it is economical. It also can be readily maintained even when salt water is used therein. The secondary filter system is constructed in such a manner so that the carbon and the filter floss utilized therein can be readily replaced. All of the operating equipment required for the aquarium is provided in one end of the tank which is concealed from view by the black acrylic plastic which surrounds the same. It is very quiet in operation because the air pump which is utilized is in itself very quiet and also because the air pump is contained within the walls of the aquarium and is covered by the cover 12. Use of the cover 12 ensures that the aquarium is fully covered at all times which reduces to a minimum contamination from the outside atmosphere. In addition, it reduces evaporation of water from the aquarium.

The view which is presented to the viewer of the self-contained aquarium system through the front wall 18 is unspoiled by unsightly wires, tubes and the like. Also, the view is unspoiled by being able to see any equipment utilized for operating the aquarium. Similarly, the black trim strips 20, 21 and 22 provide a border around the viewing area of the panel 18 and serve to frame the picture which is formed by the aquarium. In addition, the bottom strip serves to conceal from view the grid-like structure 43 utilized for supporting the layers 46 and 47.

It is apparent from the foregoing that there has been provided a new and improved self-contained aquarium system which has many features and in particular which is very quiet in operation and which has a very attractive appearance.

What is claimed is:

1. In a self-contained aquarium system, a tank for containing water and having a bottom wall and side walls, a first dividing wall disposed within the tank and forming a main compartment in the tank and an equipment compartment in the tank, a second dividing wall disposed in the equipment compartment and dividing the equipment compartment into a secondary filtering compartment and an air lift compartment, a filter grid disposed in the main compartment of the tank and providing a filter surface spaced above the bottom wall of the tank, primary filtering means carried by the filter grid, said first dividing wall having an opening therein adjacent the bottom wall of the tank to permit the flow of water from below the filter grid in the main compartment of the tank into the secondary filtering compartment, said second dividing wall in the equipment compartment having an opening therein adjacent the bottom wall of the tank, removable secondary filtering means disposed adjacent the bottom wall of the tank in the secondary filtering compartment and formed in such a manner so that water flowing from below the filter grid in the main compartment of the tank through the opening in the first dividing wall must flow through the secondary filtering means and then through the opening in the second dividing wall, a removable air pump compartment which is free of water including means for supporting the air pump compartment in a predetermined elevation within the air lift compartment so that the upper end of the air pump compartment is disposed above the surface of the water which otherwise substantially fills the main compartment and the secondary filtering compartment and the remainder of the air lift compartment when the tank is substantially filled with water, removable air pump means disposed within the air pump compartment, means establishing fluid communication between the air lift compartment and the main compartment and including air lift means in the air lift compartment utilizing air from the air pump means for supplying water from the air lift compartment into the main compartment of the tank.

2. A system as in claim 1 wherein said means for supporting the air pump compartment includes a pedestal secured to the air pump compartment and adapted to rest upon the bottom wall of the tank.

3. A system as in claim 1 together with heating means disposed in the air lift compartment.

4. A system as in claim 1 in which said air lift means includes air stone means disposed in the air lift compartment, means for supplying air from the air pump means to the air stone means, and in which said means establishing fluid communication between the air lift compartment and the main compartment includes pipe means having a lower open end disposed over the air stone means and means for connecting the upper end of the pipe into the main compartment of the aquarium so that water is supplied by air lift principles from the air lift compartment to the main compartment.

5. In a self-contained aquarium system, a tank for containing water and having a bottom wall and side walls, a first dividing wall disposed within the tank and forming a main compartment in the tank and an equipment compartment within the tank, a second dividing wall disposed in the equipment compartment and dividing the equipment compartment into a secondary filtering compartment and an air lift compartment, a filter grid disposed in the main compartment of the tank and providing a filter surface spaced above the bottom wall of the tank, primary filtering means carried by the filter grid, said first dividing wall having an opening therein to permit the flow of water from below the filter grid in the main compartment of the tank into the secondary filtering compartment, said second dividing wall in the equipment compartment having an opening therein adjacent the bottom wall of the tank, removable secondary filtering means disposed in the secondary filtering compartment, said secondary filtering means including a filter box assembly, said filter box assembly having a first opening therein adapted to be placed in registration with the opening in the first dividing wall in the tank, and a second opening remote from said first opening adapted to be placed in registration with the opening in the second dividing wall in the equipment compartment, and secondary filtering materials disposed within the filter box assembly so that water flowing from the main compartment of the tank through the opening in the first dividing wall and through said first opening in said filter box assembly must flow through the secondary filtering materials therein and then through said second opening and through the opening in said second dividing wall, removable air pump means disposed within the air lift compartment, means establishing fluid communication between the air lift compartment and the main compartment and including air lift means in the air lift compartment utilizing air from the air pump means for supplying water from the air lift compartment into the main compartment of the tank.

6. A system as in claim 5 wherein said filter box assembly includes a filter box having a bottom wall and side walls and a removable top wall secured to the side walls, and handle means secured to the removable top wall whereby the filter box assembly can be lifted out of the secondary filtering compartment to facilitate changing of the secondary filtering materials therein.

7. A system as in claim 6 wherein the secondary filtering materials in said filter box assembly comprise a layer of carbonaceous material, a layer of filter floss, means for retaining said carbonaceous material and said filter floss in layers which are separated from each other and for preventing the same from moving with the flow of water through the filter box assembly.

8. In an aquarium system, a tank for containing water and having a bottom wall and side walls, a dividing wall within the tank forming a main compartment and an equipment compartment within said tank, an opening in said dividing wall adjacent the bottom of the tank, a filter grid disposed in the main compartment of the tank and extending over substantially the entire bottom of the main compartment, primary filtering means carried by the filter grid, a removable filter box having an inlet and outlet for containing secondary filter material, said removable filter box being positioned within said equipment compartment adjacent the bottom of the tank with its inlet in registration with said opening in said dividing wall such that water moving through said opening passes into said removable filter box through said inlet and then through the secondary filter material therein to said outlet, air pump means and air lift means disposed within said equipment compartment including means establishing fluid communication between said equipment compartment and said main compartment, an air pump compartment for holding said air pump means, said air pump compartment being free of water an having an air opening disposed above the surface of the water which substantially fills both the main compartment and the remainder of the equipment compartment when the tank is substantially filled with water, said air lift means utilizing air from said air pump means for supplying with water from said equipment compartment into said main compartment.

9. The aquarium system of claim 8 wherein said removable filter box has a bottom wall and side walls and a removable top wall whereby said removable filter box can be conveniently opened to permit replacement of said filter materials therein.

* * * * *